United States Patent
Calmettes et al.

(10) Patent No.: US 9,250,309 B2
(45) Date of Patent: Feb. 2, 2016

(54) METHOD FOR THE COORDINATED PROCESSING OF SIGNALS TRANSMITTED BY BEACONS

(71) Applicants: THALES, Neuilly-sur-Seine (FR); CENTRE NATIONAL D'ETUDES SPATIALES (CNES), Paris (FR)

(72) Inventors: Thibaud Calmettes, Toulouse (FR); Michel Monnerat, Saint Jean (FR); Lionel Ries, Viviers les Montagnes (FR)

(73) Assignees: THALES, Courbevoie (FR); CENTRE NATIONAL D'ETUDES SPATIALES, Paris (FR)

( * ) Notice: Subject to any disclaimer, the term of this patent is extended or adjusted under 35 U.S.C. 154(b) by 559 days.

(21) Appl. No.: 13/659,538

(22) Filed: Oct. 24, 2012

(65) Prior Publication Data
US 2013/0106656 A1    May 2, 2013

(30) Foreign Application Priority Data
Oct. 26, 2011   (FR) ...................................... 11 03284

(51) Int. Cl.
     *G01S 1/08*      (2006.01)
     *G01S 1/68*      (2006.01)
     *G01S 5/12*      (2006.01)

(52) U.S. Cl.
CPC ... *G01S 1/08* (2013.01); *G01S 1/68* (2013.01); *G01S 5/12* (2013.01)

(58) Field of Classification Search
CPC ............... G01S 1/08; G01S 1/00; G01S 3/16; G01S 3/28; G01S 5/12
USPC .................................. 342/386, 385, 382, 383
See application file for complete search history.

(56) References Cited

U.S. PATENT DOCUMENTS

| | | | | |
|---|---|---|---|---|
| 4,240,079 A | * | 12/1980 | Zhilin | 342/352 |
| 5,796,760 A | * | 8/1998 | Wiedeman et al. | 375/130 |
| 5,926,467 A | * | 7/1999 | Hershey et al. | 370/319 |

(Continued)

FOREIGN PATENT DOCUMENTS

| EP | 1033582 A1 | 9/2000 |
|---|---|---|
| WO | 01/48941 A2 | 7/2001 |

OTHER PUBLICATIONS

Andreas Lewandowski, et al., "Performance Evaluation of Satellite-Based Search and Rescue Services: Galileo vs. Cospas-Sarsat", 68th IEEE Vehicular Technology Conference, Sep. 21, 2008, pp. 1-5, IEEE, Piscataway, NJ, USA, XP031352252.
C. Fernandez Prades, et al., "Advanced Signal Processing Techniques in Local User Terminals for Search & Rescue Systems Based on MEO Satellites", ION GNSS 18th International Technical Meeting of the Satellite Division, Sep. 13-16, 2005, pp. 1349-1360, XP55004019.

*Primary Examiner* — Harry Liu
(74) *Attorney, Agent, or Firm* — Baker Hostetler LLP

(57) ABSTRACT

A method is provided for demodulating a signal carrying a message transmitted by a terrestrial beacon, executed by a system comprising a constellation of satellites suitable for detecting said signal and for repeating it towards receiving stations on the ground, and an analysis module suitable for receiving signals from said stations. Each receiving station transmits the signals that it receives from the satellite to the analysis module, said module realigning said signals in frequency and/or in time relative to one another, combining the realigned signals to generate a synthetic signal having an enhanced signal-to-noise ratio, and determining the content of said message and/or the modulation parameters of said synthetic signal. The method applies notably to the accurate and reliable location of distress beacons by a satellite system.

10 Claims, 2 Drawing Sheets

(56) References Cited

U.S. PATENT DOCUMENTS

| | | |
|---|---|---|
| 6,317,077 B1 | 11/2001 | Solimani et al. |
| 2007/0009014 A1* | 1/2007 | Eerola et al. .................. 375/150 |
| 2012/0098699 A1* | 4/2012 | Calmettes et al. ....... 342/357.25 |
| 2012/0299776 A1* | 11/2012 | Lee et al. ...................... 342/386 |

\* cited by examiner

METHOD FOR THE COORDINATED PROCESSING OF SIGNALS TRANSMITTED BY BEACONS

CROSS-REFERENCE TO RELATED APPLICATION

This application claims priority to foreign French patent application No. FR 1103284, filed on Oct. 26, 2011, the disclosure of which is incorporated by reference in its entirety.

FIELD OF THE INVENTION

The present invention relates to a method for processing signals transmitted by beacons received by different independent sub-elements of a collection module. It applies notably to the accurate and reliable location of distress beacons by a satellite system.

BACKGROUND

One known distress beacon location system is the MEOSAR (Middle Earth Orbit Search and Rescue) system, which is a satellite system in middle earth orbit used for search and rescue. This comprises:
- signal-transmitting beacons to be located;
- relay satellites in middle earth orbit (which can be satellites used in a geolocation and navigation system, a system that is often designated by the acronym GNSS, standing for Global Navigation Satellite System);
- independent processing modules on the ground, or stations, sometimes also qualified as MEOLUT (Middle Earth Orbit Local User Terminals);
- a centre for coordinating the processing modules on the ground, sometimes qualified as MTCF, standing for MEOLUT Tracking Coordination Facility.

The centre for coordinating the processing modules on the ground makes it possible to assist in the programming of the antennas of the different modules in order to improve the coverage and the overall efficiency of the network of modules, in particular when the modules are equipped with a number of antennas (as is the case with some MEOLUT stations).

An SAR (Search and Rescue) distress beacon is seen simultaneously by a number of satellites which pick up the signals that it transmits and retransmit them to stations on the ground. These stations on the ground demodulate the beacon messages coded in the signals, then measure the times of arrival (TOA) of the signals as well as the frequency shift that these signals (FOA, standing for Frequency of Arrival) have undergone by Doppler effect in order to determine the position of the beacon.

However, the signal-to-noise ratio of the received signals is not always sufficient to enable the stations to analyse them in order to locate the beacon, or even in order to determine the content of its message. Thus, even when a sufficient number of satellites—generally, four satellites—has been able to transmit beacon signals, the TOA and FOA cannot be determined for all these signals, which prevents the position of the beacon from being determined.

The degradation of the signal-to-noise ratio can be inherently heterogeneous, and caused notably by the environment of the beacon during transmission, by the atmospheric propagation, by the relay satellite used, and by the environment of the MEOLUT station on reception.

SUMMARY OF THE INVENTION

One aim of the invention is to propose means for detecting signals transmitted by a beacon in a more reliable and more accurate manner than with the known systems. To this aim, the subject of the invention is a method for demodulating a signal carrying a message transmitted by a terrestrial beacon, executed by a system comprising a constellation of satellites suitable for detecting said signal and for repeating it towards receiving stations on the ground, and an analysis module suitable for receiving signals from said stations, wherein each receiving station transmits the signals that it receives from the satellite to the analysis module, said module realigning said signals in frequency and/or in time relative to one another, combining the realigned signals to generate a synthetic signal having an enhanced signal-to-noise ratio, and determining the content of said message and/or the modulation parameters of said synthetic signal.

According to one implementation of the demodulation method according to the invention, the signal transmitted by the beacon begins with a pure carrier, the step of mutually realigning the signals comprising a phase of searching for this pure carrier by searching for the frequency difference between the signals received by the stations for which the result of a correlation between said signals comes closest to a pure carrier signal.

According to one implementation of the demodulation method according to the invention, the signal comprises a synchronization word, the step of mutually realigning the signals comprising a phase of searching for the time and frequency differences of the signals between them by performing a correlation calculation on the synchronization word.

According to one implementation of the demodulation method according to the invention, a replica signal is generated from the determined modulation parameters, and said replica signal is compared with the signals received by the stations on the ground in order to determine the measurements of time and frequency of arrival of the signal.

According to one implementation of the demodulation method according to the invention, the analysis module broadcasts to at least one station the optimum replica generated.

According to one implementation of the demodulation method according to the invention, at least one receiving station receives a signal transmitted by one and the same satellite via a number of different antenna channels, the receiving station selecting from said channels the signal provided with the best signal-to-noise ratio before transmitting it to the analysis module.

According to one implementation of the demodulation method according to the invention, the analysis module broadcasts to at least one station parameters characteristic of the beacon signal (binary content, modulation index, bit rate, bit rise time, bit phase model) instead of the complete signal.

Another subject of the invention is a method for locating a signal-transmitting terrestrial beacon, the steps of the demodulation method as described above are executed, the location method also comprising a step of analysing said parameters to determine the location of the beacon.

Another subject of the invention is a system for locating a beacon transmitting a signal transmitted by a terrestrial beacon, wherein said system comprises an analysis module suitable for executing the steps of the abovementioned location method.

According to one embodiment of the location system according to the invention, the system comprises means for coordinating the stations suitable for programming and for coordinating orientations of the antennas of the modules, and the analysis module is colocated with said coordination means, the analysis module being configured to share the same antennas for transmitting to the receiving stations as the coordination means. This embodiment makes it possible to reduce the transmission means used to communicate with the receiving modules. The coordination centre is sometimes designated by the acronym "MTCF", standing for MEOLUT Tracking Coordination Facility.

According to another embodiment of the location system according to the invention, the system comprises communication means between the stations, and the analysis module is colocated with one of said stations.

According to another embodiment of the location system according to the invention, the system comprises communication means between the stations, and an analysis module is colocated in each of said stations.

BRIEF DESCRIPTION OF THE DRAWINGS

Other features will become apparent from reading the following detailed description given as a nonlimiting example, given in light of the appended drawings which represent.

DETAILED DESCRIPTION

Figure 1:
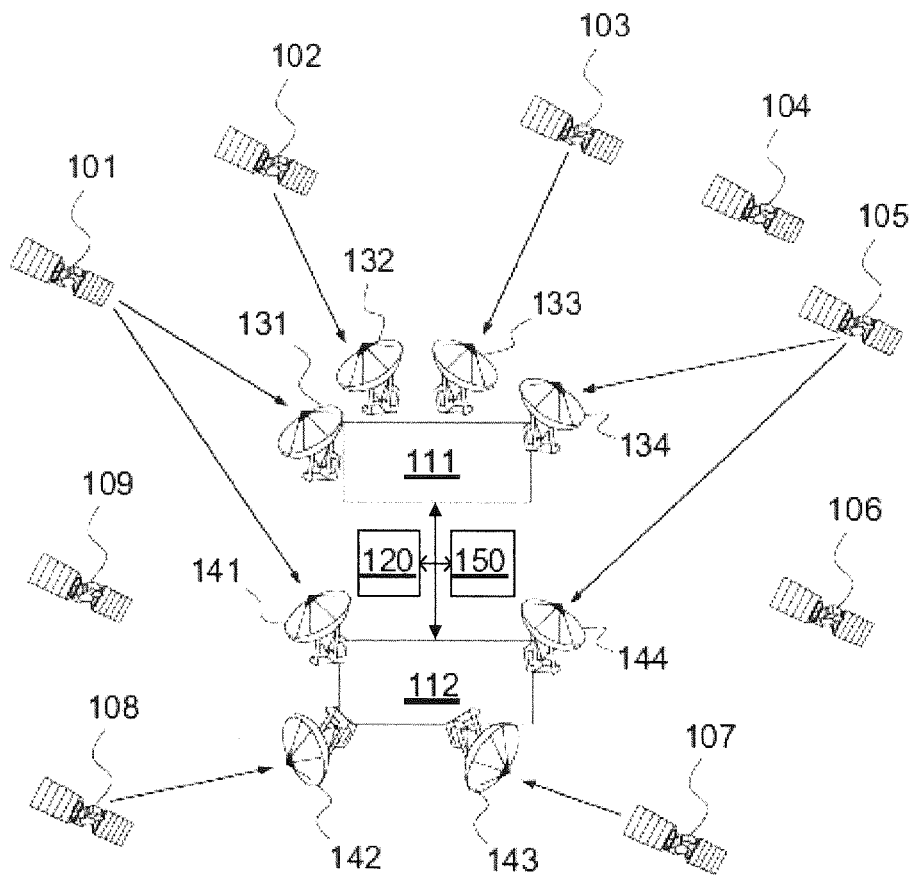
FIG. 1, an illustration of a system according to the invention.

FIG. 1 illustrates a system according to the invention. The system 100 comprises a constellation of satellites 101, 102, 103, 104, 105, 106, 107, 108 moving in middle altitude orbit (of the order of 22 000 km altitude), receiving stations 111, 112 distributed at different points on the earth's surface—in the example, MEOLUT (Middle Earth Orbit Local User Terminal) stations and a coordination centre 120 for the stations. Furthermore, unlike the systems of the prior art, the system according to the invention comprises an analysis module 150.

When a beacon on the ground, for example a beacon of SAR (Search and Rescue) type, transmits signals, these are received by satellites of the constellation which act as transponders by retransmitting the received signals to the ground. As an example, an SAR beacon takes the form of a module transmitting a periodic signal every 50 seconds on a carrier with a frequency approximately equal to 406 MHz.

Each receiving station 111, 112 on the ground comprises one or more antennas 131, 132, 133, 134, 141, 142, 143, 144 which are configured to pick up signals transmitted by the satellites of the constellation which, at a given instant, are within the field of visibility of the station. Thus, the signals from the beacon on the ground are transmitted to the stations 111, 112 via the satellites of the constellation. Preferably, at least four satellites that have received the signals transmitted by the beacon are within the field of visibility of one and the same station 111, 112, so that beacon location measurements can be performed by analysing the times of arrival of the signals and the Doppler frequency shift undergone by the signal.

In the example of FIG. 1, if a beacon is seen by the first satellite 101, the second satellite 102, the third satellite 103 and the fifth satellite 105, this beacon can be located by the first station 111. Similarly, if the beacon is seen by the first satellite 101, the fifth satellite 105, the seventh satellite 107 and the eighth satellite 108, this beacon can be located by the second station 112.

The coordination centre 120 makes it possible to configure the antennas of the stations 111, 112 so as to optimize the chances of reception of the beacon signals on these stations 111, 112. To transmit commands to the stations 111, 112, this coordination centre 120 also comprises communication means enabling it to communicate with the stations 111, 112.

The analysis module 150 comprises computation means which are not represented in the figure and means of communication with the stations 111, 112, also not represented. The analysis module 150 is capable of receiving signals and of transmitting signals to the stations 111, 112. It plays a central role in the implementation of the method according to the invention because it makes it possible, from a number of beacon signals received by the stations 111, 112, to combine these signals in order to produce an accurate model of the signal transmitted by the beacon. Advantageously, the analysis module 150 shares the communication means such as the antennas with the coordination centre 120, so as to reduce the volume of equipment needed to implement the method according to the invention.

Figure 2:
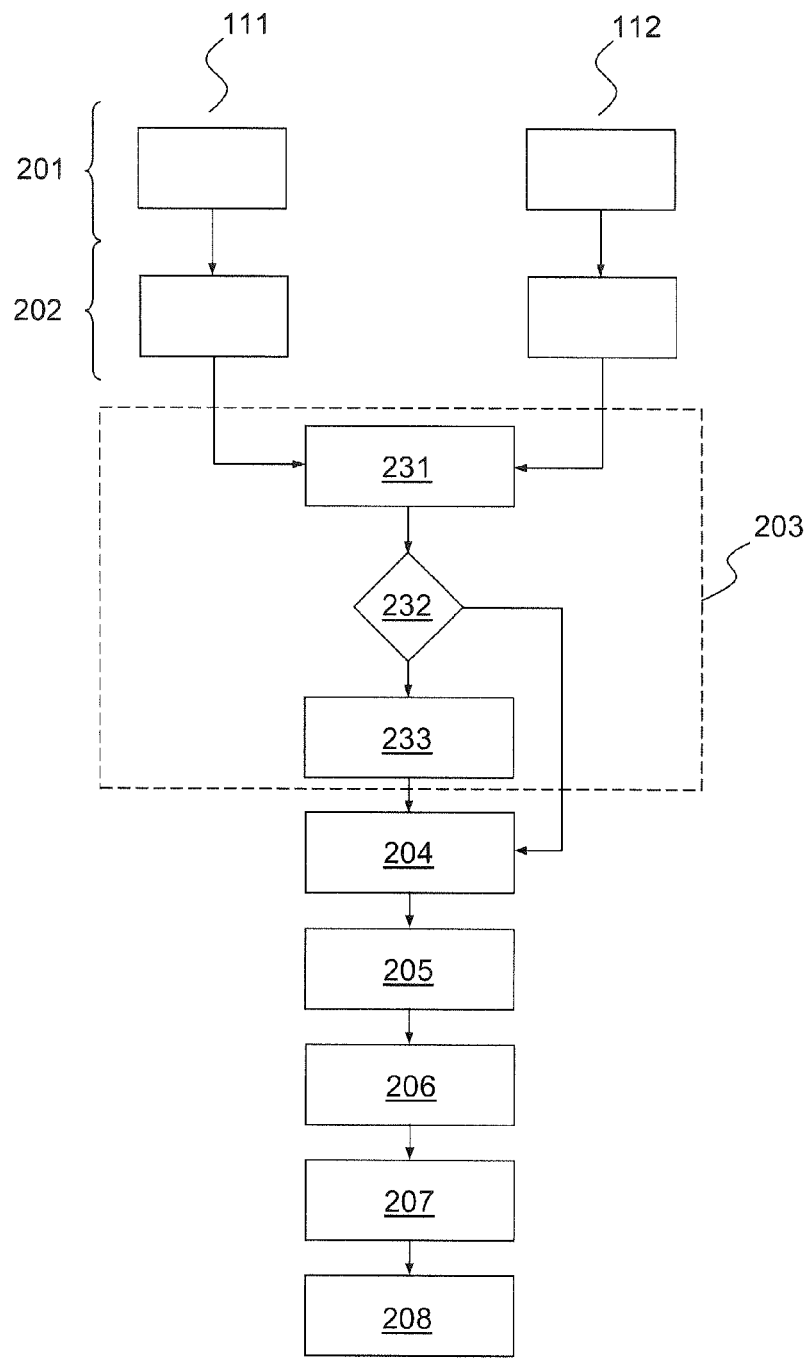
FIG. 2, a diagram illustrating the steps of a method according to the invention.

FIG. 2 illustrates the steps of a method according to the invention. In a first step 201, the signals from the beacon obtained from the different satellites 101, 102, 103, 104, 105, 106, 107, 108 acting as relay are detected by the station or stations 111, 112.

Each of the signals is affected by a specific time shift which depends notably on the distance between the station 111, 112 which received it and the satellite which transmitted it, and by a frequency shift, also called Doppler shift, which depends notably on the speed of displacement of the satellite that transmitted the signal in relation to the station 111, 112 which received it. Since the position of the relay satellites and the position of the stations 111, 112 are known, these delays and frequency shifts are known. However, the delays and frequency shifts which likewise occur on the uplink path between the beacon and the satellite are not known since the position of the beacon is not known.

In a second step 202, these stations 111, 112 correct the signal of the delay and of the Doppler shift created by the downlink channel to reconstruct a signal as it was received on board the satellite, with only the shifts due to the uplink channel. These stations then transmit these signals to the analysis module 150.

In a third step 203, the analysis module 150 mutually realigns the signals.

As an example, the wave form of the chosen signal is that of the signals transmitted by an SAR beacon. This type of signal begins with a signal in the form of a pure frequency which is followed by a synchronization word, which is followed by the content of the message carried by the signal. According to a first realignment step 231, the pure frequency of the transmitted signal is sought by correlating the received signals together, in the search domain of the frequency shifts. The frequency shift corresponding to the correlation for which a pure frequency appears most clearly indicates the Doppler difference between the signals.

The addition of the signals retransmitted by a number of satellites and/or a number of stations makes it possible to reduce the noise in as much as the latter are in fact at least partially independent. In fact, if the intermediate satellite is different, the direction of transmission and the uplink atmospheric propagation are different, and therefore decorrelated; if the satellite is identical but the receiving station is different, the same decorrelation will this time appear during the downlink phase of the signal. If both the satellite and the station are different, these two gains are added together.

A test 232 is then executed to estimate whether the abovementioned method has made it possible to reliably determine the pure frequency used in the signal transmitted by the beacon. For example, if the level of the correlation peak is below a predetermined threshold, it is considered that the frequency difference between the signals has not been able to be determined. If this pure frequency has not been able to be determined, a second step 233 is executed to search again for the time and frequency differences between the signals from the synchronization word. On completion of this step 233, the mutual time and frequency differences of the signals are determined, so that it becomes possible to realign them.

In a fourth step 204, the realigned signals are aggregated in a coherent manner in time and in frequency to produce a resultant signal for which the signal-to-noise ratio is augmented. According to one implementation of the method according to the invention, only the part corresponding to the content of the message carried by the signal is taken into account in this aggregation step (notably, by not taking into account the synchronization word). On completion of this step, there is thus a signal carrying a message, for which the signal-to-noise ratio is augmented.

In a fifth step 205, the abovementioned resultant signal is demodulated, or at least its modulation parameters are determined, these parameters being, for example, the bit rise time (or more generally the characteristic form of the bits), the modulation index and the bit rate.

In a sixth step 206, a replica of the demodulated signal is generated. This replica is a form close to the signal transmitted by the beacon; ideally, it corresponds to the exact form of the signal transmitted by the beacon.

In a seventh step 207, the replica of the demodulated signal is compared to the signals received by the stations 111, 112, so as to determine by correlation (early-late) the time of arrival (TOA) and the frequency shift (or FOA, standing for Frequency of Arrival) of the signals received on each of the stations, for each satellite in the field of visibility of this station. Thus, on completion of this step, a pair (TOA, FOA) is obtained for each pair (station, visible satellite).

In an eighth step 208, the abovementioned times of arrival and the Doppler shifts are analysed to determine the position of the beacon, according to techniques known to the person skilled in the art.

According to the exemplary method described in FIG. 2, all of the steps from the realignment step 203 are performed in the analysis module 150. According to another implementation of the method according to the invention, the processing operations can be distributed differently between the analysis module 150 and the stations. In particular, if a first station 111 has succeeded in demodulating the signal without requiring the step 203 of the analysis module 150, the signal can nevertheless be transmitted to the analysis module 150 which, by adding to it the corresponding signal received from a second station 112, will obtain a better quality replica and will therefore be able to obtain a better accuracy in the subsequent steps.

Similarly, according to one implementation of the method according to the invention, it is possible, in order to minimize the bandwidth, to arrange for the stations to no longer transmit signals to the analysis module, but only parameters—demodulated message or characteristics of the replica—characteristic of the modulation, bit rate, index, phase model (for example in the form of a series of phase samples, or of a characteristic polynomial such as Fourier, Chebyshev, Lagrange). In this case, the station uses the parameters received from a number of stations to establish an ideal set of parameters enabling the stations to themselves reconstruct the replica from these parameters.

It should be noted that one and the same station 111, 112 may receive the same signals from one and the same satellite on a number of different antennas, if these antennas are configured (for example correctly oriented) to be able to pick up signals from this satellite. In this case, a selection of the signal that has the best signal-to-noise ratio to construct the replica is advantageously performed.

According to one implementation of the method according to the invention, the processing may also be differentiated according to the stations 111, 112. For example, in the case where the analysis module 150 is closely linked with two stations 111, 112 (that is to say, connected with a link enabling signals to be exchanged), but less closely linked with a third station (not represented) (that is to say, connected with a link that allows only parameters to be exchanged), it can transmit to this third station the parameters of the replica obtained by virtue of the measurements on the first two stations 111, 112 (or at least of the best of the replicas obtained on the first two stations).

According to one implementation of the method according to the invention, the analysis module 150 is directly integrated in one of the receiving stations 111, 112, or in each of the stations 111, 112, so that each station 111, 112 can implement the steps 203 to 208 described above by combining the signals that it has received itself with the signals received by the other stations that they have retransmitted to it.

The method according to the invention makes it possible to improve the detection and improve the accuracy of the location of beacons such as SAR (Search and Rescue) beacons by virtue of the processing operations performed by an analysis module collecting the signals received by a number of stations, notably by using the redundancy of signals obtained by the visibility of one and the same beacon by a number of receiving stations on the ground.

The system according to the invention offers a number of advantages. In a system according to the prior art, if the signal-to-noise ratio on the stations is insufficient, the beacon is not located by any station whereas, with the system according to the invention, it is possible, by combining the replicas, to nevertheless obtain a successful detection. Also, regardless of the solution used for the detection (whether individual processing in the station or combinational processing), the combination of the signals in any case makes it possible to improve the quality of the replicas of the signals and the quality of the TOA and FOA measurements, and therefore the location.

The invention claimed is:

1. A method for demodulating a signal carrying a message transmitted by a terrestrial beacon, executed by a system comprising a constellation of satellites suitable for detecting said signal and for repeating it towards a plurality of receiving stations on the ground, and an analysis module suitable for receiving signals from said stations, the method comprising:
   each receiving station transmitting the signals that it receives from at least one satellite to the analysis module, said analysis module realigning said signals in frequency and/or in time relative to one another, combining the realigned signals to generate a synthetic signal having an enhanced signal-to-noise ratio, and determining a content of said message and/or modulation parameters of said synthetic signal.

2. The demodulation method according to claim 1, wherein the signal transmitted by the terrestrial beacon begins with a pure frequency, the step of realigning the signals comprises a phase of searching for said pure frequency by searching for frequency difference between the signals received by the stations for which a result of a correlation between said signals comes closest to the pure frequency signal.

3. The demodulation method according to claim 1, wherein the signal comprises a synchronization word, the step of realigning the signals comprises a phase of searching for the time and frequency differences of the signals between them by performing a correlation calculation on the synchronization word.

4. The demodulation method according to claim 1, wherein a replica signal is generated from the determined modulation parameters, and wherein said replica signal is compared with the signals received by the stations on the ground in order to determine the measurements of time and frequency of arrival of the signal.

5. A method for demodulating a signal carrying a message transmitted by a terrestrial beacon, executed by a system comprising a constellation of satellites suitable for detecting said signal and for repeating it towards a plurality of receiving stations on the ground, and an analysis module suitable for receiving signals from said stations, the method comprising:
 each receiving station transmitting the signals that it receives from at least one satellite to the analysis module, said analysis module realigning said signals in frequency and/or in time relative to one another, combining the realigned signals to generate a synthetic signal having an enhanced signal-to-noise ratio, and determining a content of said message and/or modulation parameters of said synthetic signal,
 wherein a replica signal is generated from the determined modulation parameters, and wherein said replica signal is compared with the signals received by the stations on the ground in order to determine the measurements of time and frequency of arrival of the signal, and
 wherein the analysis module broadcasts to at least one station an optimum replica generated.

6. The demodulation method according to claim 1, wherein at least one receiving station receives a signal transmitted by one satellite via a number of different antenna channels, the receiving station selecting from said channels the signal provided with a best signal-to-noise ratio before transmitting it to the analysis module.

7. The demodulation method according to claim 1, wherein the analysis module broadcasts to at least one station parameters characteristic of the beacon signal including a binary content, a modulation index, a bit rate, a bit rise time, a bit phase model, instead of a complete signal.

8. A method for locating a signal-transmitting terrestrial beacon, the method comprising:
 demodulating a signal carrying a message transmitted by the terrestrial beacon, executed by a system comprising a constellation of satellites suitable for detecting said signal and for repeating it towards a plurality of receiving stations on the ground, and an analysis module suitable for receiving signals from said stations,
 each receiving station transmitting the signals that it receives from at least one satellite to the analysis module, said module realigning said signals in frequency and/or in time relative to one another, combining the realigned signals to generate a synthetic signal having an enhanced signal-to-noise ratio, and determining a content of said message and/or modulation parameters of said synthetic signal, and
 analysing said modulation parameters to determine a location of the beacon.

9. A system for locating a beacon transmitting a signal transmitted by a terrestrial beacon, wherein said system comprises an analysis module suitable for executing the steps of the location method according to claim 8.

10. The location system according to claim 9, the system comprising means for coordinating the stations suitable for programming and coordinating orientations of the antennas of the modules in which the analysis module is colocated with said coordination means, the analysis module being configured to share the same antennas for transmitting to the receiving stations as the coordination means.

\* \* \* \* \*